Patented Oct. 21, 1924.

1,512,462

UNITED STATES PATENT OFFICE.

TURE ROBERT HAGLUND, OF STOCKHOLM, SWEDEN.

PROCESS FOR THE MANUFACTURE OF METALS, ALLOYS, AND THE LIKE.

No Drawing. Application filed September 9, 1922. Serial No. 587,214.

*To all whom it may concern:*

Be it known that I, TURE ROBERT HAGLUND, engineer, a subject of the King of Sweden, residing at Stockholm, in the Kingdom of Sweden, have invented certain new and useful Improvements in Processes for the Manufacture of Metals, Alloys, and the like; and I do hereby declare the following to be a full, clear, and exact description of the invention, such as will enable others skilled in the art to which it appertains to make and use the same.

When metals and alloys containing comparatively large quantities of the light elements, aluminum, calcium and silicon, are produced by heating the ore with reducing agents in an electric furnace according to the methods now in use there are large losses due to volatilization. This volatilization entails great inconvenience especially in the production of aluminum alloys. Hence, alloys containing more than 25% of aluminum have only rarely been produced by the process above referred to and the results have been very unsatisfactory. For the same reason, it has been found impossible hitherto to manufacture metallic aluminum of any considerable purity by a purely electro-thermic process. The volatilization of silicon is also considerable in the manufacture of silicon alloys of high silicon content.

In the process of the present invention, I reduce the losses from volatilization and also increase the speed of reduction. These objects are attained by protecting the reducing substance or substances in the furnace by a covering sulfide layer or by a layer of sulfide containing slag of low specific gravity. The sulfides of aluminum, calcium and magnesium have been found to be particularly suitable for this purpose, and the slag produced also has a relatively low melting point. The sulfide content of the slag must be at least high enough so that the slag has a lower specific gravity than the metal or alloy to be produced, at any rate at the temperature prevailing in the furnace. The molten slag acts as a solvent for the carbides as well as for the oxides of aluminum, calcium and silicon, and hence greatly facilitates the reduction.

The process is preferably carried out in an electric furnace, for example, of the carbide furnace type. The furnace is charged with reducing agents which may be carbon or carbides, etc., and the raw materials such as alumina, "oxide alundum", bauxite, clays, quartz, lime, etc., and one or more of the sulfides, $Al_2S_3$, $CaS$, $MgS$, or slags containing one or more of these sulfides, are added. The slags may be produced in previous smelts. It is also possible to replace the above mentioned sulfides with other sulfides having a lower heat of formation than aluminum sulfide; for example, $FeS$, magnetic iron pyrites, ordinary pyrites, copper pyrites and crude ores of various kinds, as these compounds in the furnace give off their sulfur to $CaO$ $Al_2O_3$ or $MgO$ in the charge in the presence of reducing agents. The corresponding sulfates and sulfites may also be used. Other mixtures containing calcium, aluminum or magnesium, and which form $CaS$, $Al_2S_3$ or $MgS$ in the furnace may be used. The mixtures of $CaS$, $MgS$ or slags containing them may also be replaced wholly or in part by substances which are converted into $CaS$ or $MgS$ by reduction, for example, $CaSO_4$ or $MgSO_4$. If the reducing agent consists wholly or in part of one or both of the carbides, $CaC_2$ or $Al_4C_3$, these carbides may form part of the mixture of substances containing calcium and aluminum which are required in the modification of the process above referred to and which result in the formation of $CaS$ or $Al_2S_3$.

The amount of the mixture added to produce the protective sulfide slag layer may obviously be varied within wide limits but it is preferable to use a slag covering which is not thicker than is necessary to obtain effective protection for the alloy or metal, as otherwise in some cases the alloy may be considerably contaminated with metal from the reduction of the sulfur compounds; for example, $FeS$.

The above process is particularly advantageous in the manufacture of alloys containing more than 50% of aluminum, calcium or silicon. Thus, for example, it is scarcely possible to produce alloys containing more than 50% of aluminum in a commercial electric reduction furnace without using a slag covering of the kind above referred to. The process may be used in the manufacture of alloys having a much lower percentage of aluminum, calcium and silicon, for example, alloys containing 20 to 30 per cent, and will in many cases give a better output than processes which omit the protective covering of slag. Another advantage is that the slag prevents the absorption of large quantities of carbon in the alloy or reduced metal.

Fluxes may be used and may consist of fluorides, such as $CaF_2$. The mixtures used in forming the sulfidiferous slag cover may be charged periodically; for example, immediately after tapping, at short intervals of time, or continuously.

The following specific example will illustrate one method of carrying out the invention to produce metallic aluminum and aluminum alloys. The process may also be used to manufacture and purify aluminum compounds, especially aluminum sulfide and mixtures of aluminum sulfide and aluminum oxide. The aluminiferous raw material consisting of a product prepared by a smelting or sintering process and containing both aluminum oxide and one or more of the sulfides of aluminum, calcium, magnesium, etc., will hereafter be termed sulfide-aluminum oxide. For example, it may be prepared by melting bauxite and aluminum sulfide in an electric furnace. Reducing agents, such as carbon, may be added, if desired to reduce $SiO_2$, $Fe_2O_3$, and $TiO_2$ contained in bauxite. The sulfide-aluminum oxide may be also be prepared by smelting bauxite with FeS and carbon, the FeS reacting with the reduced aluminum to form aluminum sulfide. Alumina or "alundum" may also be melted with one or more of the sulfides, $Al_2S_3$, CaS, MgS. The invention is not confined to any particular method of preparing the sulfide-aluminum oxide.

The sulfide-aluminum oxide is crushed to a suitable size and charged into an electric furnace; for example, an electric arc furnace of the carbide furnace type. Reducing agents are added and if necessary other ingredients. Under the heat of the arc the aluminum oxide is reduced and metallic aluminum or an aluminum alloy is produced depending on the purity of the raw materials. The reduced metal is covered by the easily melted sulfide slag of low specific gravity. As above indicated this slag protects the reduced metals from volatilizing in the arc and also aids the reduction. The principal components of the slag are usually sulfides contained in the raw materials, but it may contain more or less aluminum oxide, depending on the extent of the reduction. In certain cases the slag may also contain carbides, such as $Al_4C_3$. The sulfur content of the raw material, and hence the amount of sulfide slag obtained, may vary within wide limits. For example, the percentage of sulfide in the material may be adjusted so that the amount of slag is just sufficient to protect the reduced metal from volatilization, 10% sulfide content in the raw material may be sufficient, and in some cases an even lower percentage may be used.

If the sulfide slag is to be utilized for the purposes stated below, a raw material, containing a very high content of sulfide may be used, in which case the manufacture of the slag will be the essential feature of the process. The process will at the same time serve as a purification of the sulfide or sulfide-aluminum oxide.

If relatively pure metallic aluminum is desired and the raw materials contain considerable quantities of impurities, giving rise to silicon and iron or other substances which form an alloy with aluminum, it is advisable to carry out the reduction in two separate stages. In the first stage, only a part of the $Al_2O_3$ in the raw material is reduced and it will carry with it all the impurities, thus producing a relatively impure aluminum, together with a sulfide aluminum oxide slag which is practically free from the injurious impurities such as $SiO_2$, $TiO_2$, FeO, $Fe_2O_3$ and the like. The percentage of $Al_2O_3$ in the purified sulfide-aluminum oxide produced in the first stage may be varied by regulating the sulfide content of the raw material but the percentage should not be higher than that at which the slag produced has a lower specific gravity than the reduced metal or alloy. The purified sulfied-aluminum oxide slag produced in the first stage is then allowed to cool and is crushed and charged into an electric furnace together with reducing agents, which latter should be relatively free from ash, for example, charcoal. The metallic aluminum produced in the second stage will be comparatively pure. The reduction may go on until the aluminum in the sulfide-aluminum oxide is entirely or substantially entirely reduced, but if desired, the reduction may be regulated so as to leave more or less aluminum oxide in the sulfide slag protecting the metal.

Since the aluminum sulfide or aluminum sulfide-aluminum oxide slag produced in the first stage described above is singularly free from impurities containing silicon, iron, titanium and the like, it is peculiarly adapted for use in the preparation of metallic aluminum by electrolysis but may also be used in the production of pure alumina and pure aluminum salts. In the above-described process it is possible to add larger or smaller quantities of other aluminiferous or sulfidiferous material to the sulfide aluminum oxide slag, such as alumina, "alundum", bauxite and the like material containing one or more of the sulfides of aluminum calcium or magnesium, and compounds yielding metals on reduction with which it is desired to alloy aluminum may also be added, for example, CaO, MnO, $SiO_2$, etc. Fluxes, may also be used, for example, fluorides such as $CaF_2$.

When it is desired to purify the sulfide-aluminium oxide slag in the first stage, iron or other heavy metals may be added, as they tend to purify the slag from silicic acid and silicon dioxide. Any mechanical intrusions of iron into the slag can be separated by the usual processes, for example, magnetic separation.

The metal and slag in the processes indicated above may be tapped simultaneously or separately, for example, from different outlets. When a small percentage of sulfide is used, it is advisable to allow a certain amount of slag to remain in the furnace when tapping. When a more complete separation of slag and metal is desired, this may be secured by tapping the slag and metal and allowing them to collect in a molten state in a vessel or mixer in which the slag and metal may be allowed to separate. The alloy produced may be freed from intrusions of slag or the like by re-melting in a separate furnace or crucible, using a slag covering to protect from oxidation, if desired.

The following reducing agents are particularly suitable for the process: carbon, carboniferous substances of various kinds, such as coke, coke dust, anthracite, graphite, charcoal, and charcoal dust, carbides, such as calcium carbide and aluminum carbide. If relatively pure aluminum is desired the reducing agents should have a low ash content.

If the reducing agents or other raw material contain moisture they should first be freed from the greater part of the moisture by drying, as otherwise a considerable portion of the sulfide may be decomposed, particularly in the upper part of the furnace, by the action of water or water vapor. The drying is preferably carried out in an independent apparatus which may be heated by the gas produced in the process. If desired, however, the drying may take place in the furnace itself provided that the charging devices are arranged so that the sulfidiferous raw material does not come in contact with the material to be dried until the latter has been deprived of most of its moisture.

Various kinds of electric furnaces may be used in the above processes. The type of furnace commonly used in manufacturing carbide is a very suitable type. The furnace may have a bottom lining of carbon or carboniferous material or "alundum," aluminum nitride may be used where an especially pure aluminum or a carbon-free alloy is desired.

The sulfide slag produced in the above processes, particularly when it consists entirely or in the main of aluminum sulfide, may be granulated by steam, compressed air or water. The aluminum sulfide is thereby converted into aluminum oxide or aluminum hydroxide. If the granulation is carried out by means of compressed air or super-heated steam, the resulting product is in some modifications of the process particularly suitable for the manufacture of a metallic aluminum by electrolysis.

The slag may also be used as a sulfidiferous raw material for producing sulfide-aluminum oxide by any method.

The term "aluminiferous metal" is used to cover pure aluminum and any alloy containing aluminium.

I claim:

1. Process for producing aluminum, silicon or calcium or alloys, containing at least a comparatively high percentage of one or more of said low specific gravity elements, which comprises reducing the ores in an electric furnace by means of normally solid reducing agents and forming over the reduced metal a protective covering of low specific gravity slag containing at least a comparatively high percentage of low specific gravity sulfides.

2. Process for producing aluminiferous metals which comprises reducing in an electric furnace a charge containing aluminum oxide and at least one of the following low specific gravity sulfides $Al_2S_3$, CaS or MgS, and carrying on the process in such a way that a covering of low specific gravity slag containing at least a comparatively high percentage of sulfide is formed over the reduced aluminiferous metal.

3. Process for producing aluminum, which comprises reducing in an electric furnace a charge of aluminum oxide and at least one of the following low specific gravity sulfides, $Al_2S_3$, CaS or MgS, substantially free from impurities, and carrying on the process in such a way that a covering of slag, containing at least a comparatively high percentage of low specific gravity sulfide, is formed over the reduced aluminum.

4. Process for producing an aluminiferous metal, which comprises reducing in an electric furnace a charge containing aluminum oxide and at least one of the following low specific gravity sulfides, $Al_2S_3$, CaS or MgS, substantially free from silicon and silicon compounds, and carrying on the process in such a way that a covering of slag, containing at least a comparatively high percentage of low specific gravity sulfide, is formed over the reduced aluminiferous metal.

5. Process for producing aluminum, which comprises reducing in an electric furnace a charge of aluminum oxide and at least one of the following low specific gravity sulfides, $Al_2S_3$, CaS, or MgS, substantially free from silicon, iron and compounds of the same, and carrying on the process in such a way that a covering of slag, containing at least a comparatively high percentage of low specific gravity sulfide, is formed over the reduced aluminum.

6. Process for producing aluminiferous metals, containing at least 25 per cent aluminum, which comprises heating in an electric furnace a charge containing aluminum oxide, and sulfidiferous material, and carboniferous reducing agents and carrying on the process in such a way that a covering of slag, containing at least a comparatively high percentage of low specific gravity sulfide, is formed over the reduced metal.

7. Process for producing aluminiferous metals, which comprises heating in an electric furnace a charge containing aluminum oxide, and at least one of the following low specific gravity sulfides, $Al_2S_3$, CaS, or MgS, and carboniferous reducing agents and carrying on the process in such a way that a covering of slag, containing at least a comparatively high percentage of low specific gravity sulfide, is formed over the reducing metal.

8. Process for producing aluminiferous metals containing at least 25 per cent aluminum, which comprises heating in an electric furnace a charge containing aluminum oxide and sulfidiferous material and dry carboniferous reducing agents and carrying on the process in such a way that a covering of slag, containing at least a comparatively high percentage of low specific gravity sulfide, is formed over the reduced aluminiferous metal.

9. Process for producing aluminum, which comprises heating in an electric furnace a charge of aluminum oxide and at least one of the following low specific gravity sulfides, $Al_2S_3$, CaS, or MgS, and dry carboniferous reducing agents and carrying on the process in such a way that a covering of slag, containing at least a comparatively high percentage of low specific gravity sulfide, is formed over the reduced aluminum.

10. Process for producing aluminiferous metals which comprises heating in an electric furnace a charge containing aluminum oxide and carboniferous reducing agents and sulfidiferous material, preventing moisture in the charge from coming in contact with the sulfidiferous material and carrying on the process in such a way that a covering of slag, containing at least a comparatively high percentage of low specific gravity sulfide, is formed over the reduced metal.

11. Process for producing aluminum, which comprises heating in an electric furnace a charge of aluminum oxide and carboniferous reducing agent with material containing low specific gravity sulfide, preventing moisture in the charge from coming in contact with low specific gravity sulfide, and carrying on the process in such a way that a covering of slag, containing at least a comparatively high percentage of low specific gravity sulfide, is formed over the reduced metal.

12. Process for producing aluminiferous metals which comprises heating in an electric furnace a charge containing aluminum oxide and sulfidiferous material and reducing agents, carrying on the process in such a way that a covering of slag, containing at least a comparatively high percentage of low specific gravity sulfide, is formed over the reduced metal, tapping the furnace and granulating slag produced.

13. Process for producing aluminiferous metals, which comprises first heating in an electric furnace bauxite and sulfidiferous materials together with reducing agents, carrying on this process in such a way that a material containing aluminum oxide and also at least one of the following low specific gravity sulfides, $Al_2S_3$, CaS, or MgS, is formed, and thereupon heating in an electric furnace a charge of the said first produced material together with carboniferous reducing agents, and carrying on the new smelting process in such a way that a covering of slag, containing at least a comparatively high percentage of low specific gravity sulfide, is formed over the reduced metal.

14. Process for producing aluminum, which comprises first heating in an electric furnace a charge containing aluminum oxide and sulfidiferous materials, not free from iron or silicon compounds, together with reducing agents and carrying on this process in such a way that a material, containing aluminum oxide, and low specific gravity sulfide substantialy free from iron and silicon compounds, is formed, and finally heating in an electric furnace said purified material together with carboniferous reducing agents and carrying on the latter process in such a way that aluminum is reduced and a covering of slag, containing at least a comparatively high percentage of low specific gravity sulfide, is formed over the reduced aluminum.

15. Process for producing aluminum, which comprises first heating in an electric furnace a charge, containing aluminum oxide and low specific gravity sulfide, not free from iron or silicon compounds, together with reducing agents and a heavy metal, carrying on this process in such a way that a material, containing aluminum oxide and also low specific gravity sulfide, substantially free from iron and silicon compounds, is formed, thereupon heating in an electric furnace said purified material together with carboniferous reducing agents, and carrying on the latter process in such a way that aluminum is reduced and a covering of slag, containing at least a comparatively high percentage of low specific gravity sulfide, is formed over the reduced aluminum.

In testimony whereof I affix my signature.

TURE ROBERT HAGLUND.